(12) United States Patent
Zhang (10) Patent No.: US 9,395,608 B2
(45) Date of Patent: Jul. 19, 2016

(54) INDOOR-OUTDOOR PROJECTOR

(71) Applicant: GEMMY INDUSTRIES CORPORATION, Coppell, TX (US)

(72) Inventor: Cheng-Chun Zhang, Shenzhen (CN)

(73) Assignee: GEMMY INDUSTRIES CORPORATION, Coppell, TX (US)

( * ) Notice: Subject to any disclaimer, the term of this patent is extended or adjusted under 35 U.S.C. 154(b) by 217 days.

(21) Appl. No.: 14/341,345

(22) Filed: Jul. 25, 2014

(65) Prior Publication Data

US 2016/0026073 A1  Jan. 28, 2016

(51) Int. Cl.
| | |
|---|---|
| G03B 21/14 | (2006.01) |
| G03B 21/20 | (2006.01) |
| G03B 21/64 | (2006.01) |
| G03B 21/00 | (2006.01) |
| G03B 23/02 | (2006.01) |
| F21S 10/00 | (2006.01) |
| G03B 23/08 | (2006.01) |
| G03B 23/04 | (2006.01) |
| F21Y 101/02 | (2006.01) |

(52) U.S. Cl.
CPC ............ *G03B 21/142* (2013.01); *G03B 21/001* (2013.01); *G03B 21/145* (2013.01); *G03B 21/2013* (2013.01); *G03B 21/2033* (2013.01); *G03B 21/64* (2013.01); *F21S 10/007* (2013.01); *F21Y 2101/02* (2013.01); *G03B 23/02* (2013.01); *G03B 23/042* (2013.01); *G03B 23/08* (2013.01)

(58) Field of Classification Search
CPC .. G03B 21/001; G03B 21/142; G03B 21/145; G03B 21/2013; G03B 21/2033; G03B 23/08; G03B 21/64; G03B 23/02; G03B 23/042; F21S 10/007; F21Y 2101/02
See application file for complete search history.

(56) References Cited

U.S. PATENT DOCUMENTS

| | | | | | |
|---|---|---|---|---|---|
| 4,756,614 | A | * | 7/1988 | Kato | G03B 23/105 353/110 |
| 5,791,755 | A | * | 8/1998 | Henry | F21S 10/007 353/120 |
| 5,951,137 | A | * | 9/1999 | Bortz | G03B 21/16 353/119 |
| 6,227,672 | B1 | * | 5/2001 | Bortz | G03B 21/16 353/103 |
| 6,402,326 | B1 | * | 6/2002 | Bortz | G03B 21/16 353/103 |
| 6,478,453 | B2 | * | 11/2002 | Lammers | F21S 6/002 353/23 |
| 6,616,306 | B1 | * | 9/2003 | Tawil | F21S 10/02 353/109 |
| 6,695,452 | B2 | * | 2/2004 | Panasewicz | F21V 21/0824 353/119 |
| 6,769,778 | B1 | * | 8/2004 | Lloyd | G09B 27/06 353/103 |
| 7,182,472 | B2 | * | 2/2007 | Vitantonio | F16M 11/10 353/99 |
| 7,357,520 | B2 | * | 4/2008 | Vitantonio | F16M 11/10 353/119 |
| RE41,050 | E | * | 12/2009 | Panasewicz | F21V 21/0824 353/119 |
| 9,068,726 | B2 | * | 6/2015 | Zhang | F21V 14/06 |
| 9,194,551 | B1 | * | 11/2015 | Zhang | G03B 23/08 |
| 9,310,059 | B2 | * | 4/2016 | Zhang | F21V 21/30 |
| 2002/0101571 | A1 | * | 8/2002 | Panasewicz | F21V 21/0824 353/119 |
| 2002/0135742 | A1 | * | 9/2002 | Chiang | G03B 21/20 353/109 |
| 2004/0041986 | A1 | * | 3/2004 | Tawil | G03B 21/001 353/88 |
| 2004/0119951 | A1 | * | 6/2004 | Vitantonio | F16M 11/10 353/119 |
| 2006/0181684 | A1 | * | 8/2006 | Hermanson | G03B 21/28 353/31 |
| 2006/0256291 | A1 | * | 11/2006 | Vitantonio | F16M 11/10 353/22 |
| 2007/0076177 | A1 | * | 4/2007 | Vitantonio | F16M 11/10 353/99 |
| 2007/0146649 | A1 | * | 6/2007 | Daniel | G03B 21/145 353/99 |
| 2010/0157259 | A1 | * | 6/2010 | Huang | G03B 23/14 355/30 |
| 2015/0131288 | A1 | * | 5/2015 | Zhang | F21V 14/06 362/277 |
| 2015/0159842 | A1 | * | 6/2015 | Zhang | F21V 21/30 362/231 |

* cited by examiner

*Primary Examiner* — Bao-Luan Le (74) *Attorney, Agent, or Firm* — Birch, Stewart, Kolasch & Birch, LLP (57) ABSTRACT

An indoor-outdoor projector has a housing, a slide holder and a projection lens assembly mounted on the housing, and an enhancer and a lighting device mounted in the housing. The enhancer has a mounting seat, a motor mounted on the mounting seat, and a refractive lens attached to a driving shaft of the motor and facing the projection lens assembly. The lighting device has a lighting end that can emit light. A slide with an image is inserted in the slide holder. The motor drives the refractive lens to rotate. The lighting device emits the light to pass through the rotating refractive lens, the slide, and the projection lens assembly to project a projection on a screen and to form dynamic lighting variations.

20 Claims, 8 Drawing Sheets

INDOOR-OUTDOOR PROJECTOR

BACKGROUND OF THE INVENTION

1. Field of the Invention

The present invention relates to an indoor-outdoor projector, especially to an indoor-outdoor projector that provides dynamic lighting variations.

2. Description of the Prior Art(s)

A conventional projector comprises a housing, a projection lens, and a light source. The projection lens is mounted on a front of the housing. The light source is mounted in the housing and emits light toward the projection lens. A transparent slide with an image is mounted between the light source and the projection lens. The light emitted from the light source passes through the slide and the projection lens, such that the image on the slide is projected on a screen. However, since the conventional projector cannot form variable and dynamic effects, a projection of the image is monotonous and static.

To overcome the shortcomings, the present invention provides an indoor-outdoor projector to mitigate or obviate the aforementioned problems.

SUMMARY OF THE INVENTION

The main objective of the present invention is to provide an indoor-outdoor projector. The indoor-outdoor projector has a housing, a slide holder, a projection lens assembly, an enhancer, and a lighting device. The slide holder and the projection lens assembly are mounted on the housing. The enhancer and the lighting device are mounted in the housing. The enhancer has a mounting seat, a motor, and a refractive lens. The motor is mounted on the mounting seat. The refractive lens is attached to a driving shaft of the motor and faces the projection lens assembly. The lighting device has a lighting end that can emit light.

A slide with an image is inserted in the slide holder. The motor drives the refractive lens to rotate. The lighting device emits the light to pass through the rotating refractive lens, the slide, and the projection lens assembly to project an image on a screen and to form dynamic lighting variations.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
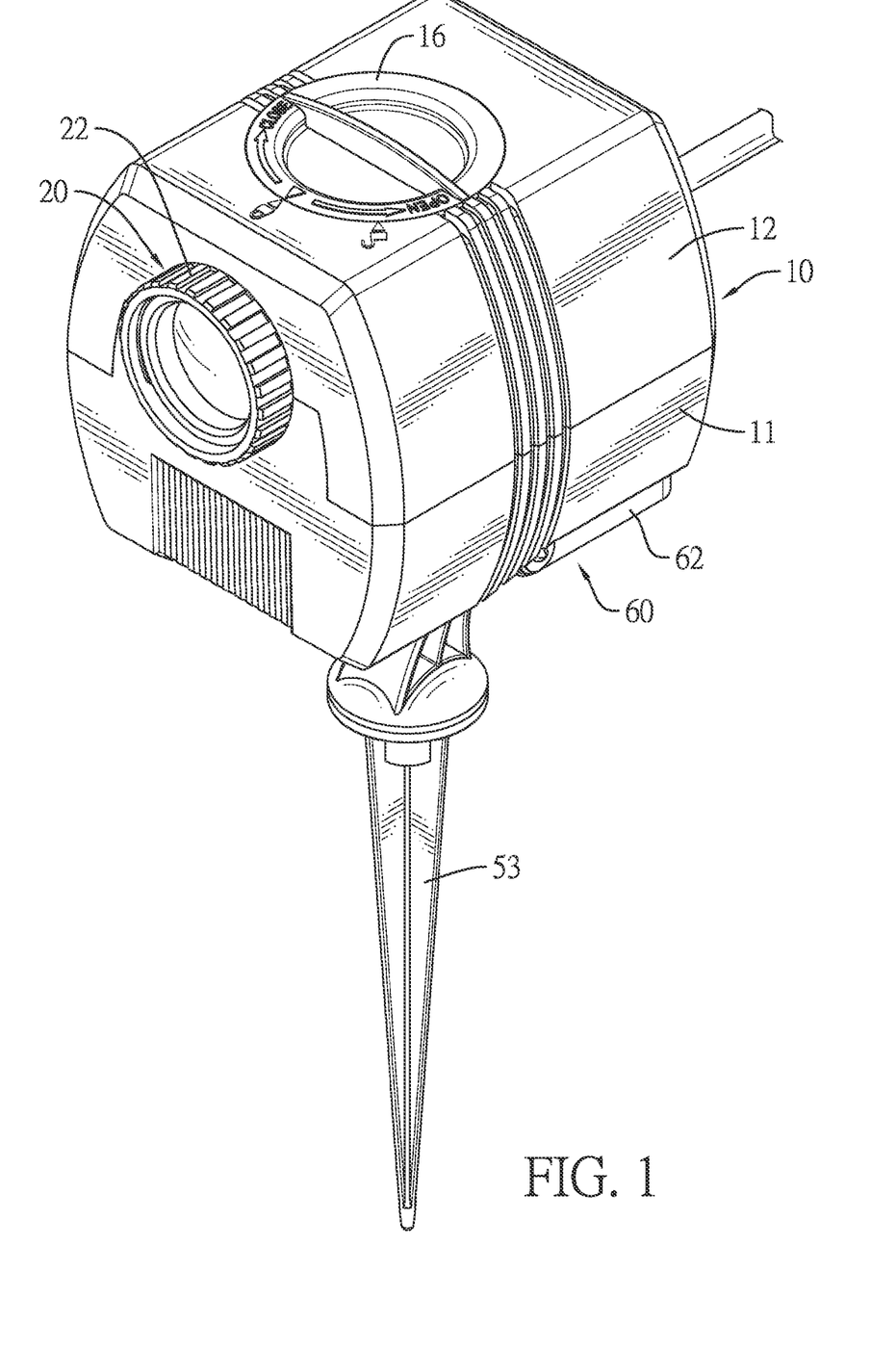
FIG. 1 is a perspective view of an indoor-outdoor projector in accordance with the present invention.
Figure 2:
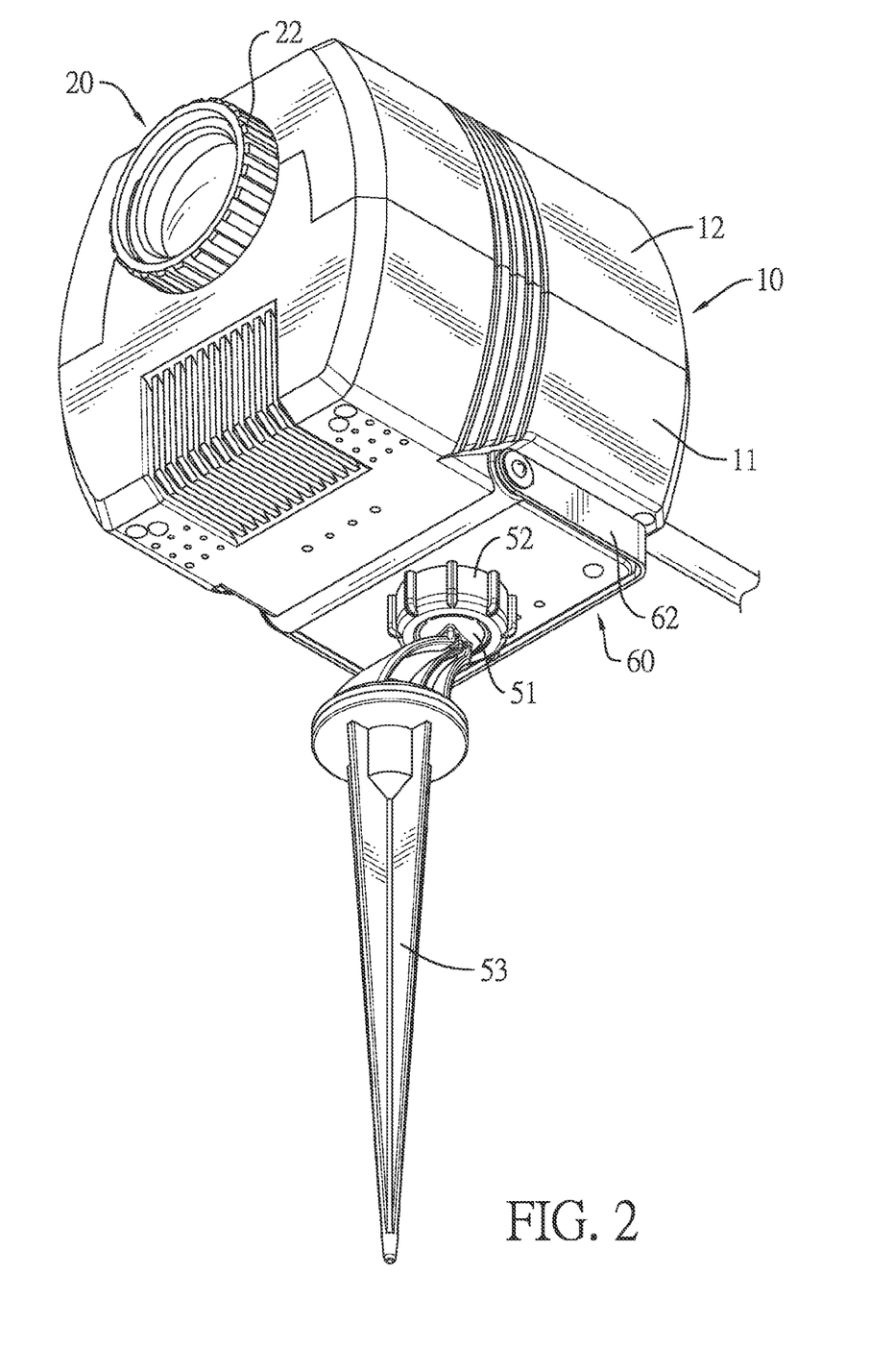
FIG. 2 is another perspective view of the indoor-outdoor projector in FIG. 1.
Figure 3:
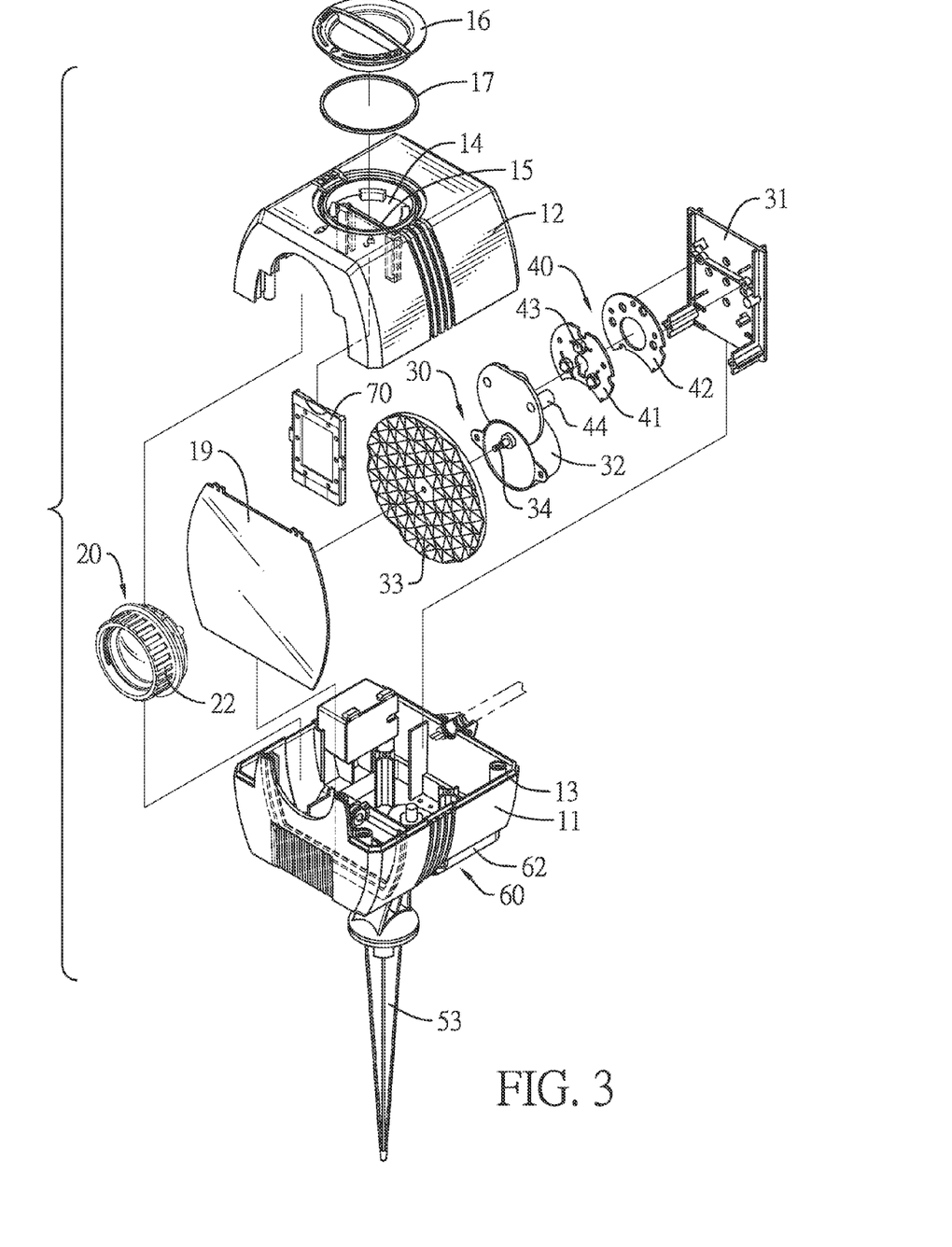
FIG. 3 is an exploded perspective view of the indoor-outdoor projector in FIG. 1.

With reference to FIGS. 1 to 3, an indoor-outdoor projector in accordance with the present invention comprises a housing 10, a projection lens assembly 20, an enhancer 30, a lighting device 40, a transparent isolation panel 19, a ball joint assembly, and a hanging assembly 60.

The housing 10 has a first casing 11, a second casing 12, a slide holder 14, a pressing cap 16, a waterproof ring 17, a mounting chamber 18, and a mounting hole.

The first casing 11 has an upper opening, a peripheral edge, and a waterproof wall 13. The peripheral edge of the first casing 11 is formed around the upper opening of the first casing 11. The waterproof watt 13 is formed on and protrudes from the peripheral edge of the first casing 11. The second casing 12 is mounted on the first casing 11, above the upper opening of the first casing 11, and around the waterproof wall 13. With the waterproof wall 13 of the first casing 11 protruding in the second casing 12, liquid or moisture do not permeate into the housing 10.

Figure 5:
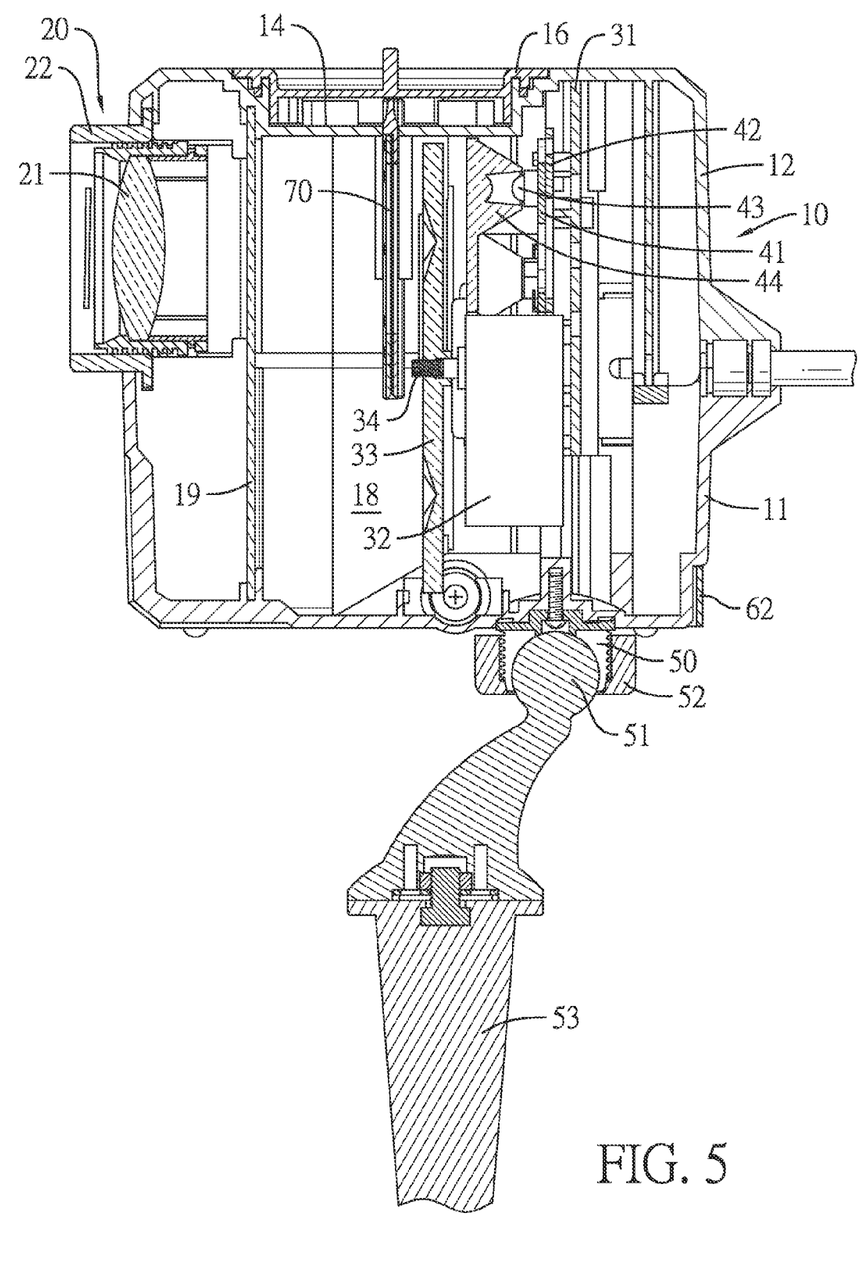
FIG. 5 is a side view in partial section of the indoor-outdoor projector in FIG. 1.

With further reference to FIG. 5, the slide holder 14 is mounted on and disposed in the second housing 12. The slide holder 14 has a slot 15. The pressing cap 16 is mounted on the second casing 12 and selectively covers the slide holder 14. The waterproof ring 17 is mounted around and between the slide holder 14 and the pressing cap 16. The mounting chamber 18 is defined in the housing 10. The mounting hole is formed through a front of the housing 10.

The projection lens assembly 20 is mounted in the mounting hole of the housing 10 and includes a convex lens 21 and a focusing ring 22. The focusing ring 22 is mounted in the mounting hole of the housing 10 and around the convex lens 21. When the focusing ring 22 is turned, a position of the convex lens 21 is adjusted. Accordingly, a focus of the convex lens 21 is adjusted.

The enhancer 30 is mounted in the mounting chamber 18 of the housing 10. The enhancer 30 includes a mounting seat 31, a motor 32, and a refractive lens 33. The mounting seat 31 is mounted in the mounting chamber 18 of the housing 10. The motor 32 is mounted on the mounting seat 31 and has a driving shaft 34. The refractive lens 33 is securely attached to the driving shaft 34 of the motor 32, faces the projection lens assembly 20, and is driven to rotate by the driving shaft 34 of the motor 32.

The lighting device 40 is mounted on the mounting seat 31, is disposed between the mounting seat 31 and the refractive lens 33, and has a lighting end. The lighting end of the lighting device 40 faces the refractive lens 33 and the projection lens assembly 20. Specifically, the lighting device 40 includes a circuit board 41, a thermal insulation panel 42, multiple light emitting diodes (LEDs) 43, and a condenser 44. The circuit board 41 has a rear surface and a front surface. The rear surface of the circuit board 41 faces the mounting seat 31. The front surface of the circuit board 41 faces the refractive lens 33. The thermal insulation panel 42 is mounted on the rear surface of the circuit board 41. The LEDs 43 are separately mounted on the front surface of the circuit board 41. The condenser 44 is mounted on the front surface of the circuit board 41 and is disposed between the refractive lens 33 and the LEDs 43.

The transparent isolation panel 19 is mounted in the mounting chamber 18 of the housing 10 and is disposed between the projection lens assembly 20 and the refractive lens 33. The transparent isolation panel 19 prevents liquid from entering the housing 10 via the projection lens assembly 20.

Figure 4:
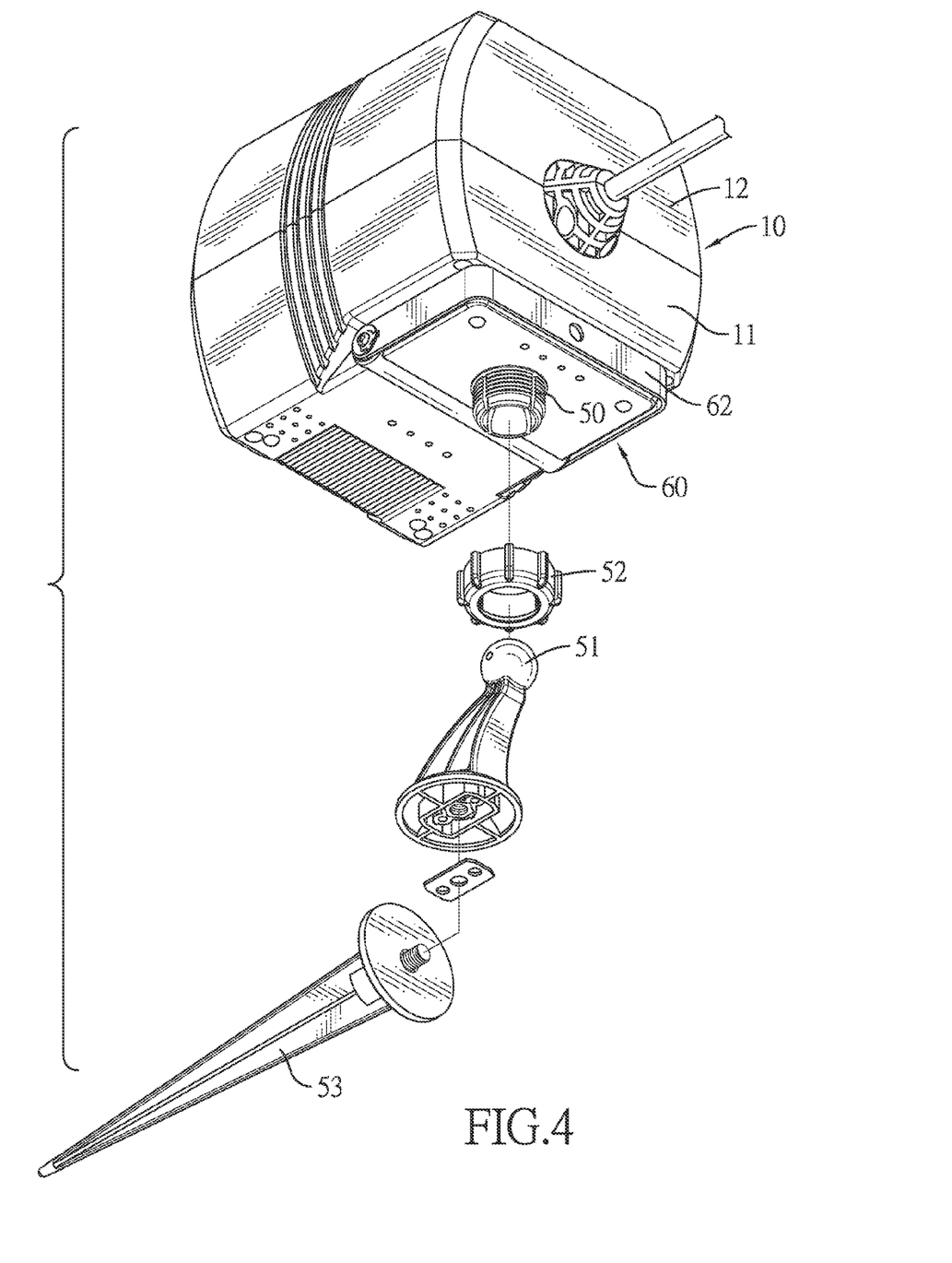
FIG. 4 is another exploded perspective view of the indoor-outdoor projector in FIG. 1.

With further reference to FIGS. 4 and 5, the ball joint assembly is mounted on an outer surface of the first casing 11 and includes a female ball joint 50, a holding ring 52, a male ball joint 51, and a grounding stick 53. The female ball joint 50 is securely mounted on the outer surface of the first easing 11. The holding ring 52 is mounted around the female ball joint 50. The male ball joint 51 is rotatably connected to the female ball joint 50 and has a distal end and a proximal end. The proximal end of the male bail joint 51 is ball-shaped, is mounted in the female ball joint 50, and is held in the female ball joint 50 by the holding ring 52. The grounding stick 53 is securely attached to the distal end of the male ball joint 51.

Figure 6:
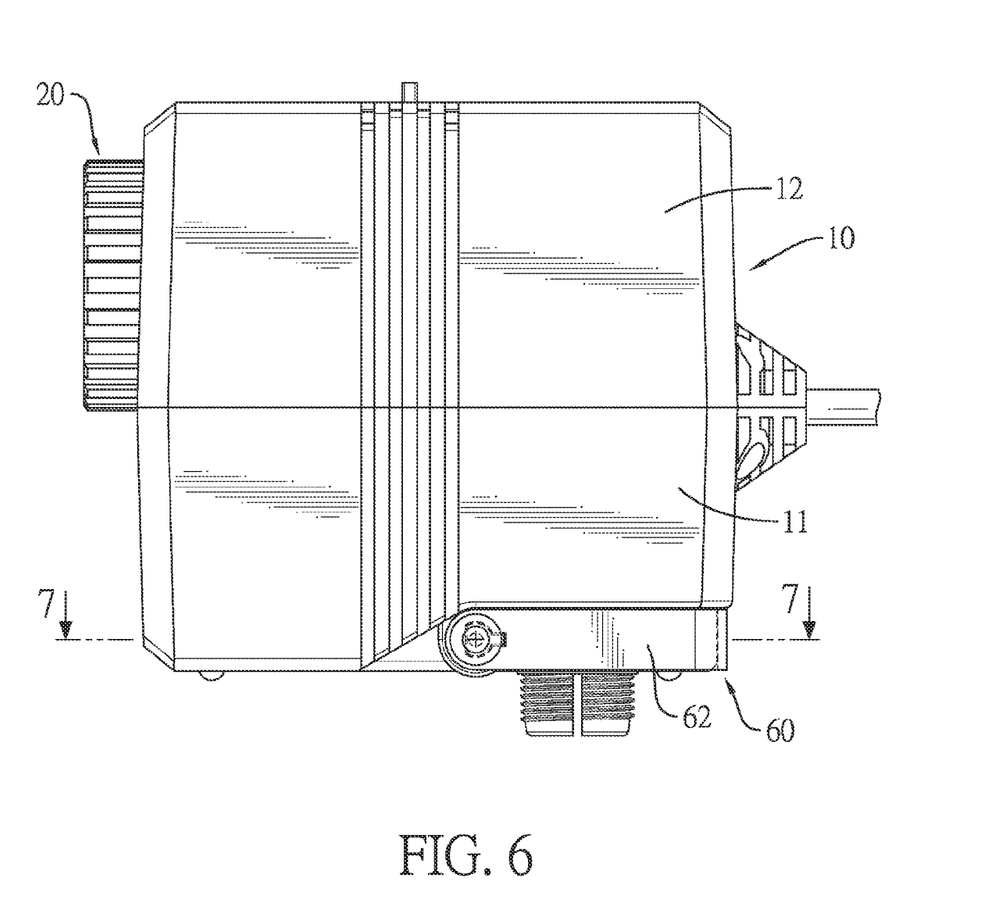
FIG. 6 is an enlarged side view of the indoor-outdoor projector in FIG. 1.
Figure 7:
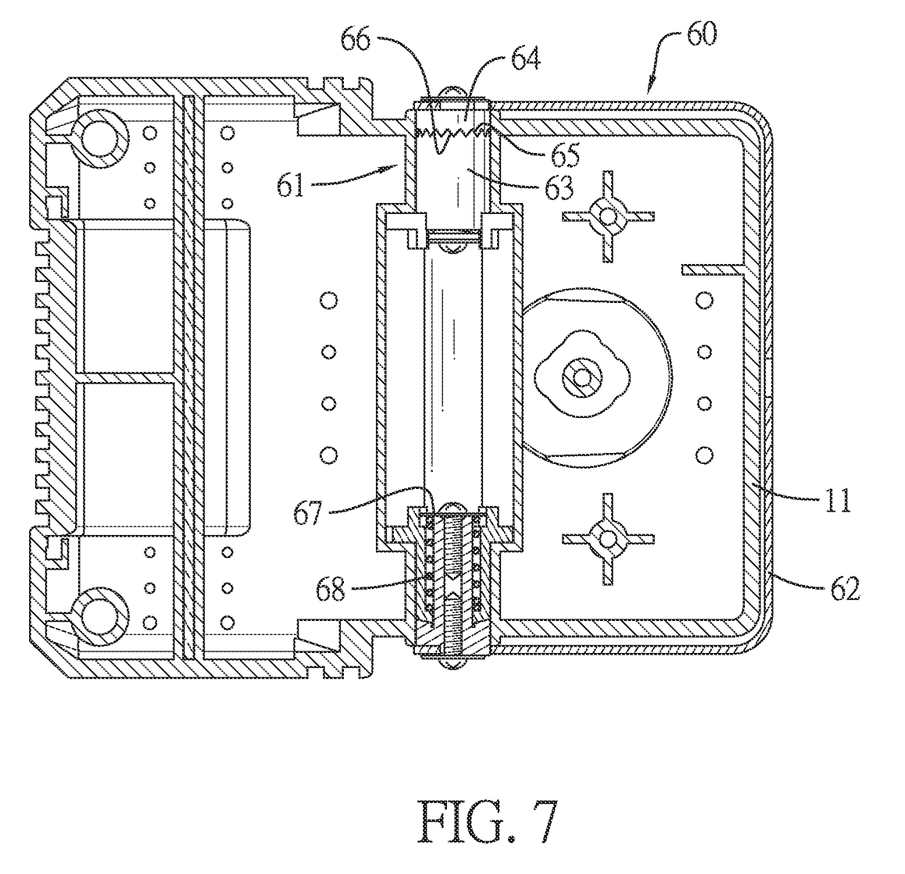
FIG. 7 is a top view in partial section of the indoor-outdoor projector along line 7-7 in FIG. 6.

With further reference to FIGS. 6 and 7, the hanging assembly 60 is mounted on the outer surface of the first easing 11 and includes two angle adjusting mechanisms 61 and a handle 62.

The angle adjusting mechanisms 61 are separately mounted on the first casing 11 and are disposed opposite to each other. Each of the angle adjusting mechanisms 61 includes an inner connector 63, an outer connector 64, a limit panel 67, and a resilient element 68. The inner connector 63 is securely mounted on the first easing 11 and has an inner end, an outer end surface, and an inner toothed portion 65. The inner toothed portion 65 is formed on the outer end surface of the inner connector 63. The outer connector 64 is rotatably mounted through the inner connector 63 and has an inner end, an outer head, and an outer toothed portion 66. The inner end of the outer connector 64 protrudes toward and out of the inner end of the inner connector 63. The outer head of the outer connector 64 is opposite to the inner end of the outer connector 64 and has an inner end surface facing the outer end surface of the inner connector 63. The outer toothed portion 66 is formed on the inner end surface of the outer head of the outer connector 64 and engages with the inner toothed portion 65 of the inner connector 63. The limit panel 67 is securely mounted on the inner end of the outer connector 64. The resilient element 68 is mounted between the inner connector 63 and the outer connector 64. The resilient element 68 has two ends respectively abutting the inner connector 63 and the limit panel 67.

The handle 62 is U-shaped and has two ends. The two ends of the handle 62 are respectively connected securely to the outer connectors 64 of the angle adjusting mechanisms 61.

In use, a slide 70 with an image is inserted in the slot 15 of the slide holder 14 of the housing 10, and the pressing cap 16 covers the slide holder 14. Then the motor 32 of the enhancer 30 drives the refractive lens 33 to rotate, and the LEDs 43 of the lighting device 40 emits light to pass through the condenser 44 and the refractive lens 33 to form dynamic lighting variations. As the dynamic light passes through the slide 70 with the image, the image is projected on a screen via the projection lens assembly 20 with dynamic variations. Moreover, the focusing ring 22 can be turned to adjust resolution of the projected image. The waterproof wall 13 and the waterproof ring 17 improve water-resistance of the housing 10.

Figure 8:
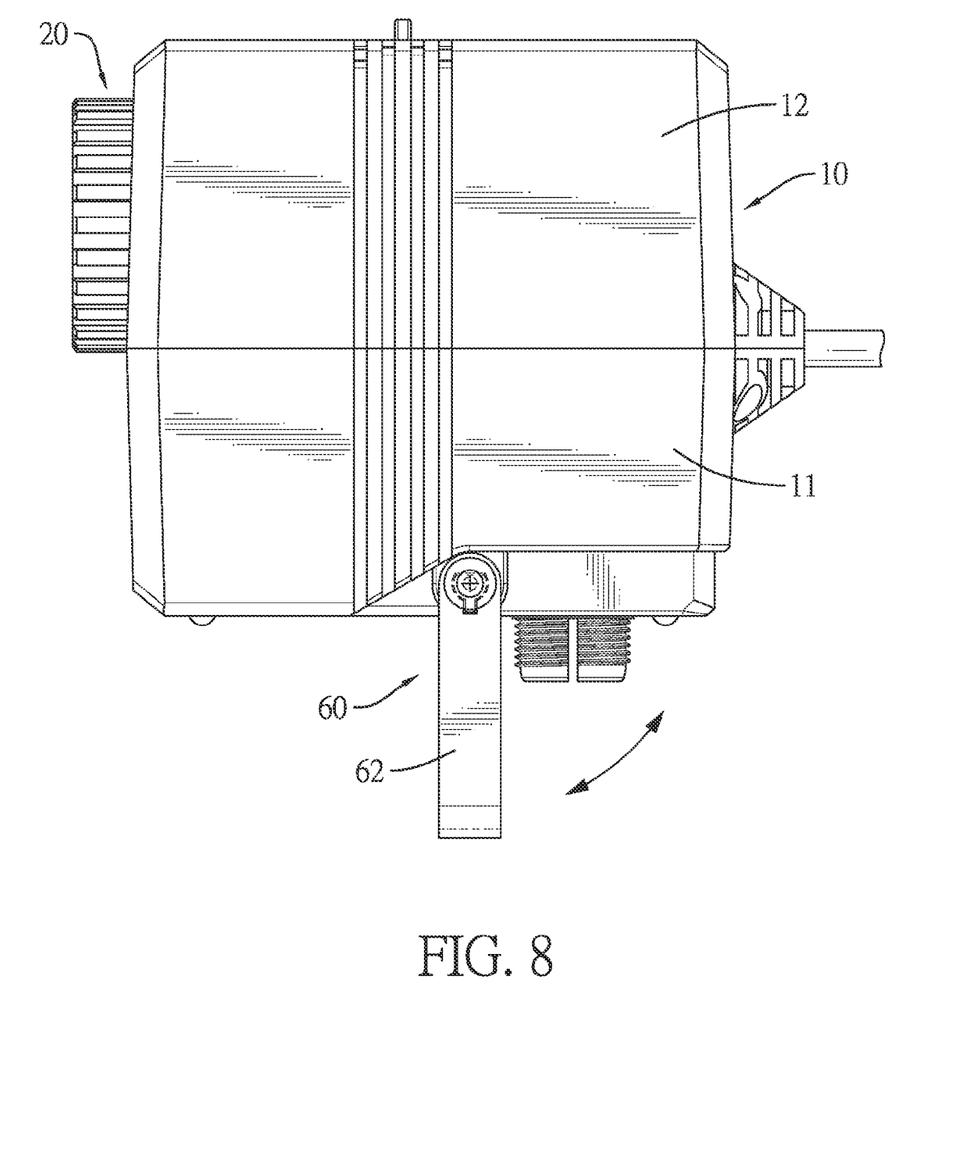
FIG. 8 is an enlarged operational side view of the indoor-outdoor projector in FIG. 1.

Furthermore, the grounding stick 53 may be inserted into the ground to fix the indoor-outdoor projector on the ground. With further reference to FIGS. 7 and 8, the indoor-outdoor projector may be hung on a ceiling or a wall via the hanging assembly 60. As the handle 62 is turned, the outer connectors 64 of the angle adjusting mechanisms 61 are turned as well. Accordingly, the outer toothed portions 66 of the outer connectors 64 rotate relative to the inner toothed portions 65 of the inner connectors 63. The outer connectors 64 slide outwardly and the resilient elements 68 are compressed. As the outer connectors 64 rotate relative to the inner connectors 63 by a specific angle, the resilient element 68 pushes the outer toothed portions 66 of the outer connectors 64 to engage with the inner toothed portions 65 of the inner connector 63 again. Thus, a relative angle between the handle 62 and the housing 10 can be adjusted. Then, the handle 62 can be hung on the ceiling or the wall.

Furthermore, the LEDs 43 of the lighting device 40 can emit light in different colors to form colorful dynamic lighting variations. The slide 70 can be changed so as to project different images.

The indoor-outdoor projector as described can project dynamic variations of images. The indoor-outdoor projector with the improved water-resistance can be used indoors and outdoors. Moreover, the indoor-outdoor projector can be fixed on the ground to be used as a projecting lamp, or can be hung on the ceiling or the wall as stage lighting. The slide 70 that is inserted in the indoor-outdoor projector can be changed to project different images. Therefore, the indoor-outdoor projector is convenient and practical for use.

Even though numerous characteristics and advantages of the present invention have been set firth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An indoor-outdoor projector comprising:
 a housing having
  a first casing having
   an upper opening;
   a peripheral edge formed around the upper opening of the first casing; and
   a waterproof wall formed on and protruding from the peripheral edge of the first casing;
  a second casing mounted on the first casing, above the upper opening of the first casing, and around the waterproof wall;
  a slide holder mounted on and disposed in the second housing, and the slide holder having a slot;
  a pressing cap mounted on the second casing and selectively covering the slide holder;
  a mounting chamber defined in the housing; and
  a mounting hole formed through a front of the housing;
 a projection lens assembly mounted in the mounting hole of the housing;
 an enhancer mounted in the mounting chamber of the housing and including
  a mounting seat mounted in the mounting chamber of the housing;
  a motor mounted on the mounting seat and having a driving shaft; and
  a refractive lens securely attached to the e driving shaft of the motor and facing the projection lens assembly; and
 a lighting device mounted on the mounting seat and having a lighting end facing the refractive lens and the projection lens assembly.

2. The indoor-outdoor projector as claimed in claim 1, wherein the projection lens assembly includes
 a convex lens; and
 a focusing ring mounted in the mounting hole of the housing and around the convex lens.

3. The indoor-outdoor projector as claimed in claim 2 further comprising a transparent isolation panel, the transparent isolation panel mounted in the mounting chamber of the housing and disposed between the projection lens assembly and the refractive lens.

4. The indoor-outdoor projector as claimed in claim 2 further comprising a ball joint assembly mounted on an outer surface of the first casing, and the ball joint assembly including:
   a female ball joint securely mounted on the outer surface of the first casing;
   a holding ring mounted around the female ball joint;
   a male ball joint rotatably connected to the female ball joint and having
      a distal end; and
      a proximal end being ball-shaped, mounted in the female ball joint, and held in the female ball joint by the holding ring; and
   a grounding stick securely attached to the distal end of the male ball joint.

5. The indoor-outdoor projector as claimed in claim 2 further comprising a hanging assembly mounted on an outer surface of the first casing, and the hanging assembly including:
   two angle adjusting mechanisms separately mounted on the first casing, and each of the angle adjusting mechanisms including
      an inner connector securely mounted on the first casing and having
         an inner end;
         an outer end surface; and
         an inner toothed portion formed on the outer end surface of the inner connector;
      an outer connector rotatably mounted through the inner connector and having
         an inner end protruding toward and out of the inner end of the inner connector;
         an outer head having an inner end surface facing the outer end surface of the inner connector; and
         an outer toothed portion formed on the inner end surface of the outer head of the outer connector and engaging with the inner toothed portion of the inner connector;
      a limit panel securely mounted on the inner end of the outer connector; and
      a resilient element mounted between the inner connector and the outer connector, the resilient element having two ends respectively abutting the inner connector and the limit panel; and
   a handle having two ends respectively connected securely to the outer connectors of the angle adjusting mechanisms.

6. The indoor-outdoor projector as claimed in claim 2, wherein the lighting device includes
   a circuit board having
      a rear surface facing the mounting seat; and
      a front surface facing the refractive lens;
   a thermal insulation panel mounted on the rear surface of the circuit board;
   multiple light emitting diodes (LEDs) separately mounted on the front surface of the circuit board; and
   a condenser mounted on the front surface of the circuit board and disposed between the refractive lens and the LEDs.

7. The indoor-outdoor projector as claimed in claim 6 further comprising a ball joint assembly mounted on an outer surface of the first casing, and the ball joint assembly including:
   a female ball joint securely mounted on the outer surface of the first casing;
   a holding ring mounted around the female ball joint;
   a male ball joint rotatably connected to the female ball joint and having
      a distal end; and
      a proximal end being ball-shaped, mounted in the female ball joint, and held in the female ball joint by the holding ring; and
   a grounding stick securely attached to the distal end of the male ball joint.

8. The indoor-outdoor projector as claimed in claim 6 further comprising a hanging assembly mounted on an outer surface of the first casing, and the hanging assembly including:
   two angle adjusting mechanisms separately mounted on the first casing, and each of the angle adjusting mechanisms including
      an inner connector securely mounted on the first casing and having
         an inner end;
         an outer end surface; and
         an inner toothed portion formed on the outer end surface of the inner connector;
      an outer connector rotatably mounted through the inner connector and having
         an inner end protruding toward and out of the inner end of the inner connector;
         an outer head having an inner end surface facing the outer end surface of the inner connector; and
         an outer toothed portion formed on the inner end surface of the outer head of the outer connector and engaging with the inner toothed portion of the inner connector;
      a limit panel securely mounted on the inner end of the outer connector; and
      a resilient element mounted between the inner connector and the outer connector, the resilient element having two ends respectively abutting the inner connector and the limit panel; and
   a handle having two ends respectively connected securely to the outer connectors of the angle adjusting mechanisms.

9. The indoor-outdoor projector as claimed in claim 6 further comprising a transparent isolation panel, the transparent isolation panel mounted in the mounting chamber of the housing and disposed between the projection lens assembly and the refractive lens.

10. The indoor-outdoor projector as claimed in claim 9 further comprising a ball joint assembly mounted on an outer surface of the first casing, and the ball joint assembly including:
   a female ball joint securely mounted on the outer surface of the first casing;
   a holding ring mounted around the female ball joint;
   a male ball joint rotatably connected to the female ball joint and having
      a distal end; and
      a proximal end being ball-shaped, mounted in the female ball joint, and held in the female ball joint by the holding ring; and
   a grounding stick securely attached to the distal end of the male ball joint.

11. The indoor-outdoor projector as claimed in claim 9 further comprising a hanging assembly mounted on an outer surface of the first casing, and the hanging assembly including:

two angle adjusting mechanisms separately mounted on the first casing, and each of the angle adjusting mechanisms including
an inner connector securely mounted on the first casing and having
an inner end;
an outer end surface; and
an inner toothed portion formed on the outer end surface of the inner connector;
an outer connector rotatably mounted through the inner connector and having
an inner end protruding toward and out of the inner end of the inner connector;
an outer head having an inner end surface facing the outer end surface of the inner connector; and
an outer toothed portion formed on the inner end surface of the outer head of the outer connector and engaging with the inner toothed portion of the inner connector;
a limit panel securely mounted on the inner end of the outer connector; and
a resilient element mounted between the inner connector and the outer connector, the resilient element having two ends respectively abutting the inner connector and the limit panel; and
a handle having two ends respectively connected securely to the outer connectors of the angle adjusting mechanisms.

12. The indoor-outdoor projector as claimed in claim 1, wherein the lighting device includes
a circuit board having
a rear surface facing the mounting seat; and
a front surface facing the refractive lens;
a thermal insulation panel mounted on the rear surface of the circuit board;
multiple light emitting diodes (LEDs) separately mounted on the front surface of the circuit board; and
a condenser mounted on the front surface of the circuit board and disposed between the refractive lens and the LEDs.

13. The indoor-outdoor projector as claimed in claim 12 further comprising a transparent isolation panel, the transparent isolation panel mounted in the mounting chamber of the housing and disposed between the projection lens assembly and the refractive lens.

14. The indoor-outdoor projector as claimed in claim 12 further comprising a bail joint assembly mounted on an outer surface of the first casing, and the ball joint assembly including:
a female ball joint securely mounted on the outer surface of the first casing;
a holding ring mounted around the female ball joint;
a male ball joint rotatably connected to the female ball joint and having
a distal end; and
a proximal end being ball-shaped, mounted in the female ball joint, and held in the female ball joint by the holding ring; and
a grounding stick securely attached to the distal end of the male ball joint.

15. The indoor-outdoor projector as claimed in claim 12 further comprising a hanging assembly mounted on an outer surface of the first casing, and the hanging assembly including:
two angle adjusting mechanisms separately mounted on the first casing, and each of the angle adjusting mechanisms including
an inner connector securely mounted on the first casing and having
an inner end;
an outer end surface; and
an inner toothed portion formed on the outer end surface of the inner connector;
an outer connector rotatably mounted through the inner connector and having
an inner end protruding toward and out of the inner end of the inner connector;
an outer head having an inner end surface facing the outer end surface of the inner connector; and
an outer toothed portion formed on the inner end surface of the outer head of the outer connector and engaging with the inner toothed portion of the inner connector;
a limit panel securely mounted on the inner end of the outer connector; and
a resilient element mounted between the inner connector and the outer connector, the resilient element having two ends respectively abutting the inner connector and the limit panel; and
a handle having two ends respectively connected securely to the outer connectors of the angle adjusting mechanisms.

16. The indoor-outdoor projector as claimed in claim 1 further comprising a transparent isolation panel, the transparent isolation panel mounted in the mourning chamber of the housing and disposed between the projection lens assembly and the refractive lens.

17. The indoor-outdoor projector as claimed in claim 16 further comprising a ball joint assembly mounted on an outer surface of the first casing, and the ball joint assembly including:
a female ball joint securely mounted on the outer surface of the first casing;
a holding ring mounted around the female ball joint;
a male ball joint rotatably connected to the female ball joint and having
a distal end; and
a proximal end being ball-shaped, mounted in the female ball joint, and held in the female ball joint by the holding ring; and
a grounding stick securely attached to the distal end of the male ball joint.

18. The indoor-outdoor projector as claimed in claim 16 further comprising a hanging assembly mounted on an outer surface of the first casing, and the hanging assembly including:
two angle adjusting mechanisms separately mounted on the first casing, and each of the angle adjusting mechanisms including
an inner connector securely mounted on the first casing and having
an inner end;
an outer end surface; and
an inner toothed portion formed on the outer end surface of the inner connector;
an outer connector rotatably mounted through the inner connector and having
an inner end protruding toward and out of the inner end of the inner connector;
an outer head having an inner end surface facing the outer end surface of the inner connector; and an outer toothed portion formed on the inner end surface of the outer head of the outer connector and engaging with the inner toothed portion of the inner connector;

a limit panel securely mounted on the inner end of the outer connector; and a resilient element mounted between the inner connector and the outer connector, the resilient element having two ends respectively abutting the inner connector and the limit panel; and a handle having two ends respectively connected securely to the outer connectors of the angle adjusting mechanisms.

19. The indoor-outdoor projector as claimed in claim 1 further comprising a hanging assembly mounted on an outer surface of the first casing, and the hanging assembly including:

two angle adjusting mechanisms separately mounted on the first casing, and each of the angle adjusting mechanisms including an inner connector securely mounted on the first casing and having
an inner end;
an outer end surface; and
an inner toothed portion formed on the outer end surface of the inner connector;

an outer connector rotatably mounted through the inner connector and having
an inner end protruding toward and out of the inner end of the inner connector;
an outer head having an inner end surface facing the outer end surface of the inner connector; and
an outer toothed portion formed on the inner end surface of the outer head of the outer connector and engaging with the inner toothed portion of the inner connector;

a limit panel securely mounted on the inner end of the outer connector; and a resilient element mounted between the inner connector and the outer connector, the resilient element having two ends respectively abutting the inner connector and the limit panel; and a handle having two ends respectively connected securely to the outer connectors of the angle adjusting mechanisms.

20. The indoor-outdoor projector as claimed in claim 1 further comprising a bail joint assembly mounted on an outer surface of the first casing, and the ball joint assembly including:

a female ball joint securely mounted on the outer surface of the first casing;

a holding ring mounted around the female ball joint;

a male hail joint rotatably connected to the female ball joint and having
a distal end; and
a proximal end being ball-shaped, mounted in the female ball joint, and held in the female ball joint by the holding ring; and a grounding stick securely attached to the distal end of the male ball joint.

* * * * *